(12) United States Patent
Key, Jr.

(10) Patent No.: US 6,613,141 B2
(45) Date of Patent: Sep. 2, 2003

(54) RECOVERY OF CEMENT KILN DUST THROUGH PRECIPITATION OF CALCIUM SULFATE USING SULFURIC ACID SOLUTION

(76) Inventor: Jerry F. Key, Jr., 563 Little River 58, Foreman, AR (US) 71836

( * ) Notice: Subject to any disclaimer, the term of this patent is extended or adjusted under 35 U.S.C. 154(b) by 0 days.

(21) Appl. No.: 10/207,316

(22) Filed: Sep. 26, 2002

(65) Prior Publication Data

US 2003/0061972 A1 Apr. 3, 2003

Related U.S. Application Data

(60) Provisional application No. 60/325,655, filed on Sep. 27, 2001.

(51) Int. Cl.[7] .............................................. C04B 11/00
(52) U.S. Cl. ........................ 106/751; 106/772; 423/555
(58) Field of Search ................................. 106/751, 772; 423/555

(56) References Cited

U.S. PATENT DOCUMENTS

| | | | |
|---|---|---|---|
| 4,049,462 | A | 9/1977 | Cocozza |
| 4,716,027 | A | 12/1987 | Morrison |
| 4,915,914 | A | 4/1990 | Morrison |
| 5,788,944 | A | 8/1998 | Kikkawa |
| 6,231,767 | B1 | 5/2001 | Krofchak |

*Primary Examiner*—Paul Marcantoni
(74) *Attorney, Agent, or Firm*—Bracewell & Patterson LLP

(57) ABSTRACT

A method and apparatus for recovering calcium sulfate di-hydrate (gypsum) from a precipitation reaction between cement kiln dust and commercial, spent or waste grade sulfuric acid solution. The gypsum recovered from this process acts as a necessary functional additive for use in the production of hydraulic Portland cement. The invention advantageously provides for a method of producing a fertilizer as a byproduct of the gypsum production process. The invention also provides a method of producing Portland cement using the gypsum derived from the cement kiln dust.

23 Claims, 7 Drawing Sheets

Type III ASTM C-109 Cement Strength

ASTM C-191 (Vicat Method) Time of Set

Alkali as Na2O Equivalent

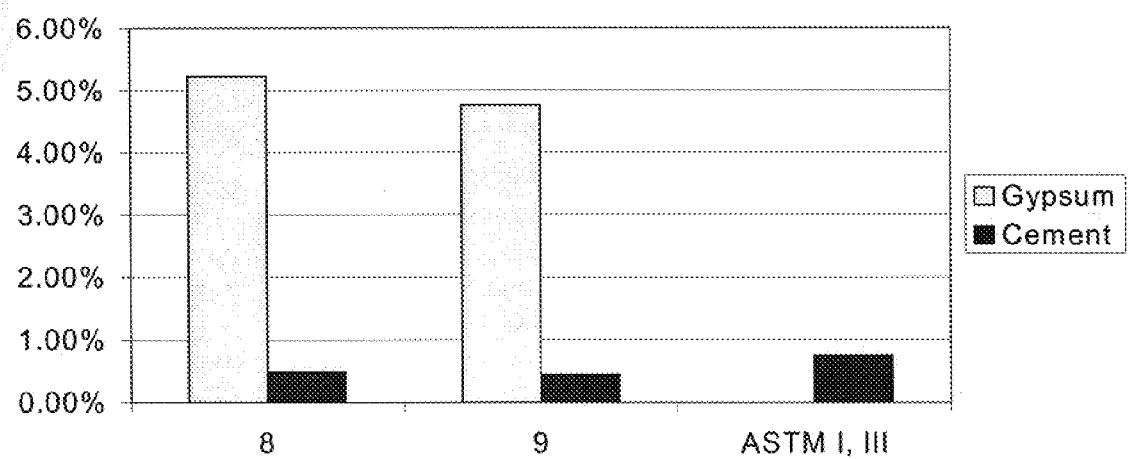
FIG. 7, Insoluble Content of CDK-Derived Gypsum and Resulting Cement

RECOVERY OF CEMENT KILN DUST THROUGH PRECIPITATION OF CALCIUM SULFATE USING SULFURIC ACID SOLUTION

RELATED APPLICATIONS

This application claims the benefit of U.S. Provisional Patent Application Ser. No. 60/325,655, filed on Sep. 27, 2001, which hereby is incorporated by reference in its entirety.

BACKGROUND OF THE INVENTION

1. Field of the Invention

This application generally relates to cement industry processes. In more specific aspects, the invention relates to methods of recovering products from cement kiln dust (CKD) produced during cement industry processes. The invention also relates to alternative disposal methods for waste sulfuric acid.

2. Description of the Prior Art

With the increased costs for disposing of wastes and the decrease of available places to send wastes, reducing the amount of wastes that need to be discarded has become more important. Non-hazardous wastes and hazardous wastes each have its own set of problems. Issues such as toxicity, harm to the environment, and the amount of waste created cause problems for those with these types of wastes that need to be discarded. For example, waste sulfuric acid is toxic and is regulated as a hazardous waste. The primary way to dispose of waste sulfuric acid is to have it incinerated. Incinerating waste, or spent, sulfuric acid is expensive and there are many regulatory requirements associated with its disposal.

Various methods have been used to produce or recover reusable compounds from waste materials, which in turn reduces the amount of waste that needs to be disposed of and decreases raw material costs for the reusable compound. Cement kiln dust (CKD) is one such type of waste that is produced during the use of a kiln during most cement manufacturing processes. Attempts have also been made to recover reusable compounds from the CKD and decrease the amount of CKD that has to be discarded.

One such example of making a reusable compound from waste materials can be found in U.S. Pat. No. 4,049,462, issued to Cocozza. The Cocozza patent relates to the chemical fixation of industrial desulfurization residues by forming a mixture of the residue, such as a flue gas desulfurization sludge, with an alkaline calcination stack dust, such as CKD in the presence of water. The pH of the mass is adjusted with sulfuric acid to a value of below about 7.0. The mixture is then dried into a shaped article to produce a solid, cement-like fixed product. Stack dust contains constituents such as calcium, silicon aluminum, iron, magnesium, sodium, potassium and associated constituents found in cement making and similar stack dust, for example, in the form of oxides and salts. The industrial waste residue can be any such residue or sludge as, for example, is produced in the after-removal of pollutants, such as sulfur constituents from the effluent or flue gas of basic manufacturing processes, such as fossil fuel consumption reaction or cement making or ore roasting reaction processes. These manufacturing processes often generate sulfur oxides, especially sulfur dioxide, which must be removed from the reaction effluent by scrubbing or absorbing techniques before venting to the atmosphere in order to avoid environmental pollution. An advantageous source of sulfuric acid is a spent industrial waste acid liquor, such as a spent pickle liquor of about 3–10% concentration.

Another example of trying to recover reusable products from CKD can be found in U.S. Pat. Nos. 4,716,027, and 4,915,914, both issued to Morrison. These patents describe neutralizing cement kiln dust so that it is suitable as a feed stock to the cement kiln and at the same time scrubbing the exhaust fumes to reduce $SO_2$ levels. The precipitate from the neutralization process is suitable as kiln feed stock. The precipitate is sent to a kiln with other raw materials, where the raw materials are heated and produce clinker. The clinker from the kiln is then ground and mixed with gypsum to form cement. The alkali salt solution from the neutralization process is dried and forms a fertilizer. This process decreases the amount of waste that is produced due to use of a kiln during the cement manufacturing process.

Since gypsum is mixed with clinker to produce cement, it is desirable to recover gypsum from CKD. Gypsum can be produced by various method. One such method can be found in the Kikkawa patent, U.S. Pat. No. 5,788,944. The Kikkawa patent discloses a process where exhaust gas is brought into contact with liquid to absorb sulfur oxide. Limestone particles with specific diameters are retained in a zone for contact with absorbing liquid to neutralize the liquid. The gypsum formed thereby is drained and recycled.

In addition to gypsum, other materials that can be reused within the cement process. An example of this can be found in U.S. Pat. No. 6,231,767, issued to Krofchak. The Krofchak patent discloses a process for treating phosphatic clay suspensions, waste clay and phosphogypsum. This includes deflocculation to create a suspension of these components. The resulting phosphatic mineral and sand suspension is dissolved in dilute sulfuric acid to separate a phosphatic fraction as phosphoric acid from a sand fraction. A cementitious material is produced that is formed into an inert solid material.

A need exists for a process that will reduce the amount of CKD that needs to be disposed of as a result of existing cement processes and produce a product that is reusable within the cement production process. It is an object and a goal to convert a waste product to a desirable product, particularly one that currently is purchased to reduce raw material costs within the cement production process. Another object and goal of the present invention is to reduce the amount of gypsum that is purchased by recovering gypsum from waste streams from the kilns used within the cement manufacturing process. A further object and goal is to decrease the amount of cement kiln dust that needs to be disposed of and recovering a useful product from the cement kiln dust. It is yet another object and goal to provide a use for spent or waste sulfuric acid, as opposed to disposing of the spent or waste sulfuric acid.

SUMMARY OF THE INVENTION

In order to meet one or more of the identified objects, the present invention advantageously includes a method for treating raw or modified CKD using waste or by-product sulfuric acid solution to form a gypsum product or gypsum blend. Raw CKD, or primary CKD, contains the highest level of calcium carbonate on a weight basis. Modified CKD, or subsequent grades of CKD can contain much lower levels of calcium carbonate. The gypsum product can include calcium sulfate dihydrate ($CaSO_4 \cdot 2H_2O$), anhydrite forms, co-products, and intermediates. The method disclosed can produce a Portland cement quality product. The sulfuric acid solution reacts with calcium carbonate and calcium oxide forming calcium sulfates. Other forms of sulfuric acid can be used, such as oleum or fuming sulfuric acid. The use of this gypsum blend in Portland cement manufacturing with clinker is functionally equivalent to that of commercially mined gypsum currently employed by most Portland cement manufacturers.

Other embodiments of the present invention are also provided, all of which are believed to improve the quality of the gypsum produced for use in Portland cement blending. As one of the alternate embodiments, the invention advantageously includes sweetening the raw or modified CKD with calcium rich by-products or limestone, shale or dolomite ores to enhance the calcium oxide equivalent available to the sulfuric acid for reaction. Another embodiment of this invention preferably includes the removal of alkali as an $Na_2O$, or sodium oxide, equivalent in the raw or modified CKD or gypsum co-product of the reaction through removal of water-soluble components. In this embodiment, the treatment of the CKD-Sulfuric Acid product will improve the quality of the Portland cement grade calcium sulfate blend by lowering the potassium and sodium water-soluble components using pre-treatment or post-treatment methods described herein.

The invention also advantageously provides a method and apparatus for producing Portland cement by utilizing the gypsum product derived from the CKD and produced in accordance with the present invention.

BRIEF DESCRIPTION OF THE DRAWING

So that the manner in which the features, advantages and objects of the invention, as well as others which will become apparent, can be understood in more detail, more particular description of the invention briefly summarized above can be had by reference to the embodiment thereof which is illustrated in the appended drawings, which form a part of this specification. It is to be noted, however, that the drawings illustrate only a preferred embodiment of the invention and is therefore not to be considered limiting of the invention's scope as it can admit to other equally effective embodiments.

FIG. 7 is a graph of the Insoluble Content of CKD derived gypsum product and resulting cement, with the gypsum product being made in accordance with one embodiment of the present invention.

DETAILED DESCRIPTION

Figure 1:
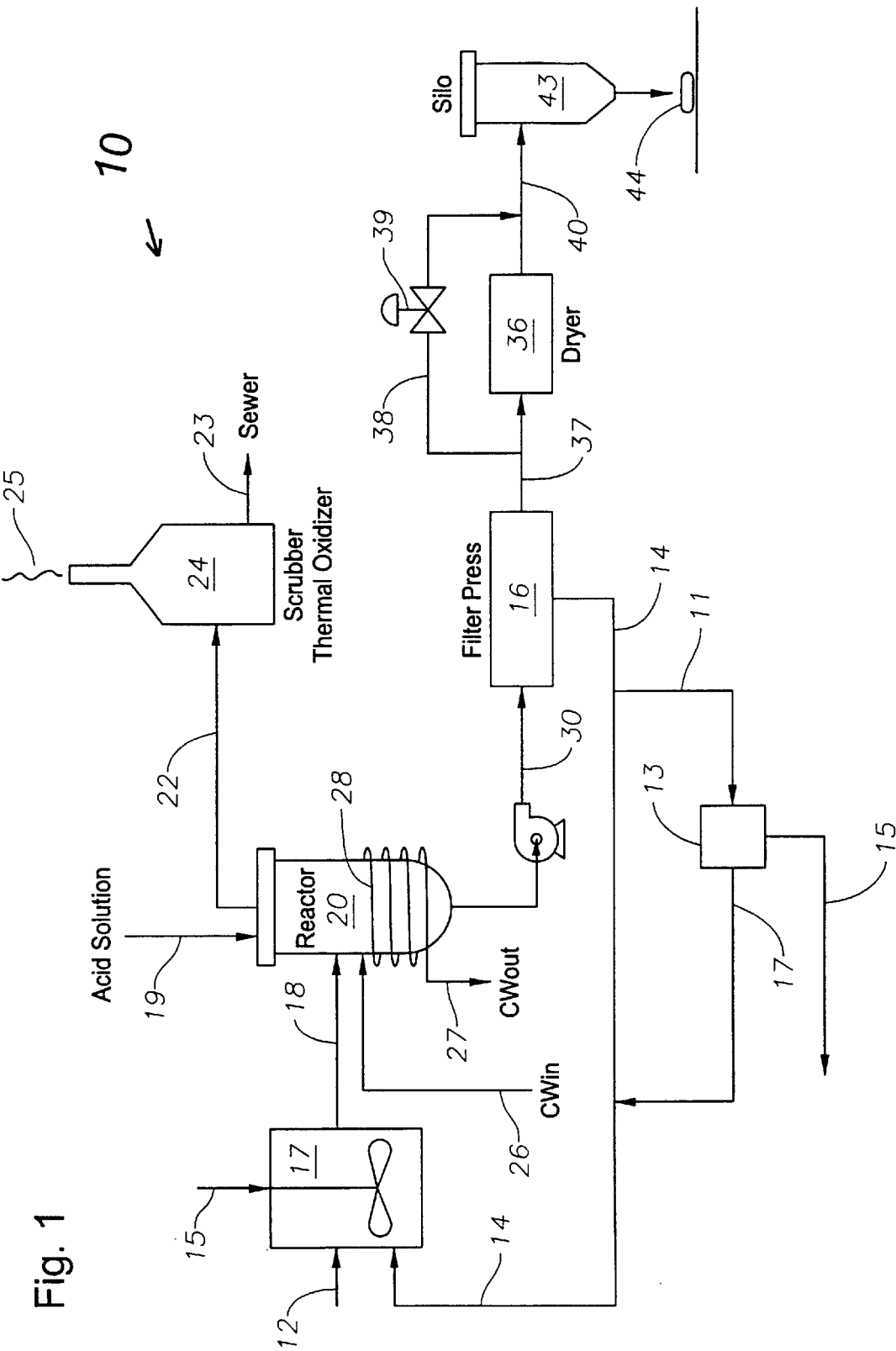
FIG. 1 is a simplified flow diagram of a process of recovering a gypsum product from cement kiln dust (CKD) according to the present invention.

The present invention advantageously provides a method and apparatus for producing gypsum product that is recovered from cement kiln dust (CKD). This invention includes a process of treating CKD through a precipitation reaction with spent or by-product sulfuric acid, and/or commercially available sulfuric acid solution or oleum, resulting in a blend of calcium sulfate, which is in both anhydrite and hydrated forms, for the subsequent use in Portland cement manufacturing.

CKD is a partially calcined mixture of compounds comprised of some or all of the following chemical groupings: carbonates, sulfates and sulfites, alkali oxides, alkaline earth oxides, silicon dioxides, clinker compounds—principally as silicates, and heavy metal oxides. CKD can contain various concentrations of heavy metals including antimony, barium, beryllium, cadmium, chromium, lead, mercury, nickel, selenium, silver and thallium. Raw untreated CKD produces a highly alkaline solution (pH 11–13.5) when mixed with water. This alkalinity is primarily due to the presence of calcium carbonate in the CKD or as the slacking of calcium oxide occurs in the solution. Dust control devices associated with cement kilns, such as electrostatic precipitators (ESP's) or air pollution control devices (APCD's), collect raw CKD. Classification of CKD is presently done at some Portland cement clinker calcining operations in North America.

CKD can exist as a primary material without sieving classification from the ESP or as a second or third grade product using mechanical separation devices. The primary or raw CKD contains the highest level of calcium carbonate on a weight basis. Subsequent grades of CKD, or modified CKD, can contain much lower levels of calcium carbonate for conversion into CKD-derived gypsum product as per this invention. These grades of CKD can also be treated similarly to primary grade CKD for conversion of any remaining carbonates, oxides or hydroxides into sulfates to allow for recovery of these sulfates for purposes such as fertilizer or for sweetening with other calcium containing compounds. Results and conclusions used throughout the specification were made based upon primary grade CKD without prior classification using mechanical means.

The principal component of CKD is calcium carbonate, which accounts for between 15% and 85% by weight of CKD. Other compounds can vary in likewise fashion due to the composition of feed materials to the kiln, operating temperatures and the source of fuel consumed in the kiln at the time of CKD production. An averaged CKD X-ray fluorescence (XRF) analysis for ten samples of CKD taken randomly from three different North American cement plants is provided in Table 1.

TABLE 1

| | CKD | | |
|---|---|---|---|
| | | Weight % | |
| Component | Mean | Variance | Range |
| $SiO_2$ | 13.87 | 3.50 | 1.34 |
| $Al_2O_3$ | 4.15 | 0.17 | 0.29 |
| $Fe_2O_3$ | 1.70 | 0.07 | 0.19 |
| CaO | 42.79 | 43.57 | 4.72 |
| MgO | 0.86 | 0.23 | 0.34 |

TABLE 1-continued

CKD

| | Weight % | | |
|---|---|---|---|
| Component | Mean | Variance | Range |
| $SO_3$ | 8.45 | 15.21 | 2.79 |
| $Na_2O$ | 0.99 | 0.63 | 0.57 |
| $K_2O$ | 5.75 | 19.46 | 3.16 |
| $TiO_2$ | 0.17 | 0.00 | 0.01 |
| $P_2O_5$ | 0.13 | 0.00 | 0.02 |
| $Mn_2O_3$ | 0.07 | 0.01 | 0.05 |
| SrO | 0.08 | 0.00 | 0.02 |
| Total 'L.O.I. (950° C.) | 19.51 | 3.96 | 1.42 |
| | 98.53 | | |
| % excess CaO | 11.46 | 25.11 | 3.58 |
| % CaCO3 | 51.12 | 508.73 | 16.13 |

Gypsum product can be produced from CKD by several different methods. One preferred embodiment 10 of the method of producing gypsum product is illustrated in FIG. 1. In this embodiment 10, raw dry CKD 12 is premixed in a mixer 17 with water, water is supplied by a process water 15 or a filtrate 14 from a downstream belt filter press 16, forming a slurry stream 18 or from both. The resulting slurry stream 18 is sent to a reactor 20, which is already pre-charged with a sulfuric acid solution 19. Alternatively, aqueous sulfuric acid can be used without mixing the CKD with water prior to introduction into the reactor filled with the aqueous sulfuric acid. The water necessary for the process can be obtained from the aqueous sulfuric acid solution.

Given the range of calcium carbonate and its associated oxide, bicarbonate, and hydroxide concentrations in the CKD 12, the amount of dry weight sulfuric acid required within the sulfuric acid solution 19 to achieve the conversion to gypsum product varies according to stoichiometry. Pure calcium carbonate introduced in slurry stream 18 reacts with sulfuric acid solution 19 to yield the following:

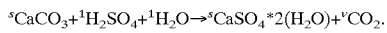

Since the composition and amount of calcium within CKD 12 varies, a more accurate manifestation of the reaction, based upon experimentation on CKD as represented in Table1, is as follows:

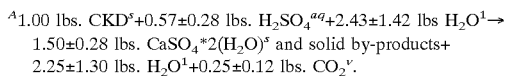

[A] Based upon 1.00 lbs. CKD with Calcium Carbonate concentrations 90% to 30% purity for ± range.

The purity of the gypsum product derived from the process of reacting untreated raw CKD using sulfuric acid solution varies directly with the corresponding abundance of calcium in the CKD sample. Table 2 illustrates the XRF spectrometry of gypsum product produced in accordance with the present invention, in which the gypsum product was produced using the same ten samples used in Table 1. CKD samples with high weight percent calcium values tended to produce the highest purity of gypsum product.

TABLE 2

Gypsum product

| | Weight % | | |
|---|---|---|---|
| Component | Mean | Variance | Range |
| $SiO_2$ | 8.29 | 1.965 | 1.002672 |
| $Al_2O_3$ | 2.26 | 0.160 | 0.286031 |
| $Fe_2O_3$ | 0.98 | 0.050 | 0.159344 |
| CaO | 29.34 | 43.540 | 4.719968 |
| MgO | 0.73 | 0.338 | 0.415733 |
| $SO_3$ | 33.24 | 31.878 | 4.038668 |
| $Na_2O$ | 0.90 | 0.469 | 0.48995 |
| $K_2O$ | 4.90 | 18.640 | 3.08825 |
| $TiO_2$ | 0.12 | 0.000 | 0.011017 |
| $P_2O_5$ | 0.08 | 0.000 | 0.009211 |
| $Mn_2O_3$ | 0.03 | 0.001 | 0.024322 |
| SrO | 0.06 | 0.000 | 0.009099 |
| Total 'L.O.I. (950° C.) | 18.03 | 9.816 | 2.241143 |
| | 98.97 | | |
| % Gypsum product Purity | 61.77 | 205.85 | 10.26 |
| % Anhydrite, $CaSO_4$ | 8.15 | 2.63 | 1.16 |

Once the resulting slurry stream 18 is in the reactor 20, the slurry stream 18 reacts with the sulfuric acid solution 19. The reactor 20 is preferably agitated to allow for optimum reaction conditions. The liberation of various vapors 22 occurs as a result of the precipitation reaction between the hydrogen ion and the carbonate or bicarbonate molecule. This primary reaction between the hydrogen ion from the sulfuric acid and the metal carbonates and bicarbonates in an aqueous environment produces carbon dioxide gas and the associated metal ion complex. The metal ion complex then forms an ionic bond with the resulting sulfate ion from the dissociation of the sulfuric acid in solution. The result is an often-hydrated metal ion sulfate. When the metal carbonate is calcium, the result is gypsum, calcium sulfate di-hydrate, as the lower energy more stable monoclinic crystal structure of the hydrate is formed. Other non-calcium metal oxides, carbonates, bicarbonates, and oxides react with the sulfuric acid solution but are considered side reactions for the purpose of this invention. Due to low levels of non-water contaminants, i.e. typically 5 wt % or less, no measurable effect is noticed on the quality of the cement grade gypsum blend by using waste or by-product sulfuric acid versus standard commercial grade sulfuric acid.

Besides carbon dioxide, the various vapors 22 that are emitted during the reaction can also include water vapor, sulfuric acid mist, and inherent volatile organic compounds from the spent sulfuric acid solution 19. The sulfuric acid mist contained within the vapor stream 22 contains traces of organic vapors, which can be neutralized by sending the vapor stream 22 to a caustic scrubber/mist eliminator system 24 and preferably in combination with a thermal oxidizing unit. Any organic vapors present in the stream would be volatized in the thermal oxidizing process.

Another product of the reaction is the generation of heat. The reaction between the calcium carbonate and sulfuric acid solution is slightly exothermic. The temperature of the reactor 20 is kept below 200° F. by circulating cooling water 26 through coils 28 within the reactor vessel 20. The reaction is complete once the substantially perfectly mixed product slurry 30 reaches the preferable pH range, which is preferably in the range of about 4.0 to about 6.5 pH. More preferably, the pH end point of the solution is between 4.0 and 5.0. At 4.3 pH, nearly all bicarbonate alkalinity has been neutralized in the solution. Once the reaction halts, the product slurry 30 is allowed sufficient residence time within the reactor 20 to cool. The product slurry 30 is discharged from the reactor 20 once it is cooled. While the present invention is described as a batch process, process modifications can be made to perform the present invention as a continuous operation without departing from the scope of the present invention. The process modifications required for continuous operation will be known to those skilled in the art.

The product slurry 30 is then conveyed, preferably by pumping, to various dewatering steps, such as the belt filter press 16 for the removal of excess water. The product slurry 30 is mechanically pressed within the belt filter press 16 to force water from the product slurry 30. The CKD-derived gypsum product slurry 30 remains as a wet cake 37 with between approximately 20% and approximately 45% free-moisture. The filtrate 14 from the belt press step is then pumped either back to the dry CKD hydration step, as previously described, or it is evaporated to recover salts therein for commercial use (not shown).

After the gypsum filter cake 37 is ejected from the belt filter press 16, it is typically conveyed to a dryer 36, which is preferably a rotary drum type dryer. The rotary drum dryer step drives off residual moisture from the wet filter cake 37, or moist pellet, to a desirable level for pneumatic conveying and storage. The dryer 36 can be by-passed to allow blending of the filter cake 37 with previously dried gypsum product 40. The dried gypsum product 40 is then combined with a binding agent for extraction and forming pellets 44 or other suitable form. The dried gypsum product 40 can also be sent to off-site for disposal in a land-fill as a non-toxic byproduct if it is not utilized for other purposes.

If the water soluble components of the gypsum filtrate 14 are desirable for use, such as for a fertilizer, the incorporation of an evaporator step can be included in the production process for CKD/Gypsum product. In this embodiment, a second filtrate 11 containing 5% to 21% water soluble material is heated. As shown in FIG. 1, the second filtrate 11 is preferably taken from the belt filter press 16 as a portion of the slurry 30 or from a pre-reactor extraction of water soluble components from the CKD dust at the mixer step 17 (not shown). At least a portion of the second filtrate 11 can be removed and evaporated in an evaporator 13 to produce a sulfate fertilizer salt 15. The heat drives off the excess water and the remaining salt 15 is then collected, dried and stored. The resulting condensate solution 17, which is primarily water that was evaporated from the second filtrate 11, can be recycled back into the gypsum production process for use in the premixing step.

The water-soluble sodium and potassium components of CKD tend to increase the $Na_2O$ alkali content of the resulting CKD-derived gypsum product if the water-soluble components are not removed. The water-soluble component of CKD contains mostly potassium sulfate, potassium chloride, sodium sulfate and calcium sulfate. Trace amounts of other components such as sodium chloride can be present as well. The soluble components can be crystallized or evaporated out of solution and marketed as fertilizer, sold for other industrial uses or discarded. The breakdown of pH neutral, 7±1, using sulfuric acid and water-soluble components of CKD from this research is as follows:

49.20% Potassium Sulfate
17.26% Potassium Chloride
17.92% Sodium Sulfate
4.26% Calcium Sulfate CKD can be pre-treated with hot water, preferably in the range of 75° F.–212° F., for removal of water-soluble components prior to the reaction with sulfuric acid. Pre-treatment is accomplished by hydrating CKD with steam or hot water and subsequently draining the water containing soluble components from the highly alkaline CKD slurry. The result is a filter cake of varying degrees of moisture content and a CKD water-soluble solution. The filter cake is principally water insoluble components remaining along with only trace amounts of the original water-soluble components.

The water-soluble components can also be removed from the resulting CKD-derived gypsum slurry post neutralization reaction with sulfuric acid as filtrate from the moisture removal step. A belt press would preferably be employed for this step. Filtrate from the initial reaction would be re-circulated back into the mixing step as process water until the saturation limit of the solution is reached. This value was experimentally determined to be 64±20 [grams solute/Liter Solution]. The saturated filtrate would be diverted to an evaporator or crystallizer for recovery of the water-soluble components as described above. Either process enhances the purity and chemical viability of the CKD-derived gypsum product as a retarding/strengthening agent for Portland cement manufacturing.

The effect on the amount of sulfuric acid consumed by the neutralization reaction introducing the pre-treat, or pre-wash, step to the CKD is minimal. The amount of sulfuric acid required to reduce the pH on the average CKD water-soluble solution from 13.0±0.5 to 7.0±0.5 is 1.08 ml±0.14 for a ½ lb. sample of CKD, as shown in Table 3. The results of Table 3 are based upon ten extractions of raw CKD using water at 200° F. to pre-treat, or pre-wash, the CKD, with the extractions being collected through a 2.5 μm filter paper using a 150 mm diameter Buchner funnel operating under 28.5 inches Hg vaccuum.

TABLE 3

EXTRACTIONS OF PRETREATED CKD

| Mean | Variance | Range | |
|---|---|---|---|
| 445 | 0 | | [3]Water [ml] |
| 227 | 0 | | CKD [Grams] |
| 242.8 | 1306.2 | 19.25 | [4]Water Sol. Comp. [ml] |
| 248.6 | 1220.3 | 18.61 | Water Sol. Comp. [grams] |
| 1.075 | 0.069 | 0.14 | 50% acid to 7 pH [ml] |
| 15.438 | 76.663 | 4.66 | Dry weight - W.S. [grams] |
| 1.024 | 0.001 | 0.02 | Density [grams/ml] |
| 0.064 | 0.002 | 0.02 | [4]Solubility [grams Salt/ ml Sol.] |

One limitation to the treatment of CKD with sulfuric acid to manufacture gypsum is the quality of the gypsum produced. Due to the nature of CKD, as a captured dust from the combustion of various fuel sources within a cement kiln, the constituents of the CKD vary both qualitatively and quantitatively. The chemical make up of CKD can have numerous chemical compounds contained in one sample. Those compounds can vary under similar conditions in the same kiln from one day to the next as the source of fuel are alternated e.g. natural gas, coal, waste chemicals recovered for heating value, tires, etc. The variance of the CKD can also be attributed to the inherent contaminants from the limestone feed to the kiln.

To improve the quantity of gypsum product recovered from CKD, CKD can be sweetened to favor the amount of calcium oxide equivalent that is available for conversion to gypsum product during the reaction step of this invention. The sweetening of CKD preferably can be done by adding calcium-rich compounds such as shale, marble, dolomite, and limestone forms of carbonate ore, calcium hydroxide, or calcium oxide by products to the CKD. USP grade calcium carbonate and limestone from a single cement plant located in North America were separately reacted with various sulfuric acid solutions from various sources, the results of which are shown in Tables 4 and 5 respectively. When compared to the results in Table 2, the amount of available calcium oxide is higher in the gypsum product derived the USP grade calcium carbonate and limestone, than in the gypsum product derived from CKD.

TABLE 4

USP GRADE CALCIUM CARBONATE

| Component | Weight % | | |
|---|---|---|---|
| | Mean | Variance | Range |
| $SiO_2$ | 0.10 | 0.010 | 0.12 |
| $Al_2O_3$ | 0.06 | 0.001 | 0.03 |
| $Fe_2O_3$ | 0.05 | 0.000 | 0.01 |
| CaO | 33.39 | 0.187 | 0.54 |
| MgO | 0.23 | 0.001 | 0.04 |
| $SO_3$ | 43.74 | 1.588 | 1.56 |
| $Na_2O$ | 0.07 | 0.001 | 0.04 |
| $K_2O$ | 0.01 | 0.000 | 0.01 |
| $TiO_2$ | 0.01 | 0.000 | 0.01 |
| $P_2O_5$ | 0.14 | 0.000 | 0.02 |
| $Mn_2O_3$ | 0.00 | 0.000 | 0.00 |
| SrO | 0.01 | 0.000 | 0.01 |
| Total 'L.O.I. (950° C.) | 22.39 | 1.296 | 1.41 |
| | 100.19 | | |
| % Gypsum Purity[5] | 94.15 | 5.07 | 2.79 |
| % Anhydrite, $CaSO_4$ | (0.08) | 0.77 | 1.09 |

TABLE 5

LIMESTONE

| Component | Weight % | | |
|---|---|---|---|
| | Mean | Variance | Range |
| $SiO_2$ | 7.19 | 0.74 | 1.07 |
| $Al_2O_3$ | 2.38 | 0.08 | 0.35 |
| $Fe_2O_3$ | 1.82 | 4.72 | 2.70 |
| CaO | 30.93 | 4.61 | 2.67 |
| MgO | 0.47 | 0.01 | 0.09 |
| $SO_3$ | 34.73 | 26.70 | 6.42 |
| $Na_2O$ | 0.14 | 0.00 | 0.01 |
| $K_2O$ | 0.34 | 0.00 | 0.04 |
| $TiO_2$ | 0.07 | 0.00 | 0.01 |
| $P_2O_5$ | 0.08 | 0.00 | 0.01 |
| $Mn_2O_3$ | 0.03 | 0.00 | 0.02 |
| SrO | 0.07 | 0.00 | 0.01 |
| Total 'L.O.I. (950° C.) | 21.92 | 8.82 | 3.69 |
| | 100.16 | | |
| % Gypsum Purity[5] | 61.04 | 354.37 | 23.37 |
| % Anhydrite, $CaSO_4$ | 10.79 | 411.49 | 25.18 |

Although the average limestone/sulfuric acid derived gypsum product purity would not necessarily increase purity value if supplemented with untreated CKD, other sources of limestone, shale or dolomite might contain high values of calcium to justify the supplementation.

Alumina ($Al_2O_3$), which can be spent or a by-product, can also be used to enhance the chemical performance of the CKD-derived gypsum product when blended into Portland cement. This step would be performed prior to the reaction step. By product aluminum sulfate can also be used for this purpose as a post reaction additive to the CKD-derived gypsum product.

The present invention also advantageously provides a method and apparatus for forming Portland cement by utilizing the gypsum product derived from the CKD, as described herein. The gypsum product is added to the other components contained within cement to regulate setting.

The method of producing Portland cement using gypsum product derived from cement kiln dust includes making the gypsum product in accordance to the methods described herein and then using the gypsum product within the production process of Portland cement. To make the gypsum product, the cement kiln dust is mixed with water to form a slurry, which is then reacted with a sulfuric acid solution to produce a filter cake. The filter cake is dried, which produces the CKD-derived gypsum product. The gypsum product is then used in the cement production process.

Figure 2:
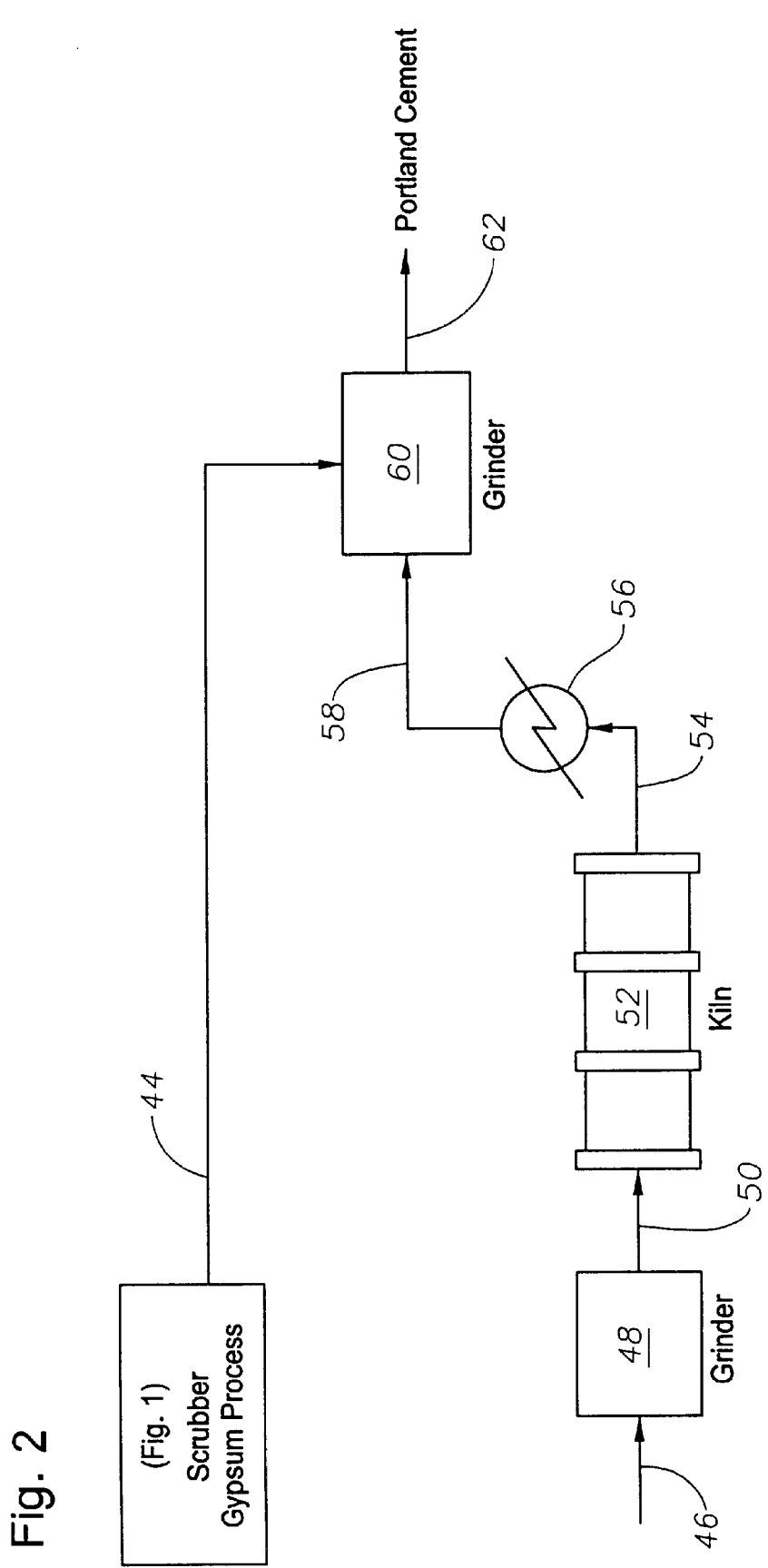
FIG. 2 is a simplified flow diagram of a process of producing Portland cement by utilizing CKD-derived gypsum product according to the present invention.

As shown in FIG. 2, once the gypsum product 44 has been made, the cement 62 is then manufactured. Typical raw materials 46 for cement include clay, shale, concrete, limestone, sand, mill scale, bauxite, fly ash, and combinations thereof. The raw materials 46 are first ground in a grinder 48 and exit as ground raw materials 50. The ground raw materials 50 are then heated in a kiln 52 to a temperature of about 2700° F., which produces a partially molten material, commonly referred to as clinker 54. The ground raw materials 50 can be preheated in a preheater tower (not shown) prior to entering the kiln 52 to conserve energy. In a typical preheater tower, hot exit gases from the kiln 52 are used to preheat the ground raw materials 50. Once the clinker 54 is produced, the clinker 54 is cooled in a cooler 56 and then mixed with the gypsum product 44 while being ground even further in a second grinder 60 to produce cement 62.

The purity level of non-treated CKD-derived gypsum product can be adequate for full or partial blending with clinker for Portland cement production at most North American cement plants. If a relative alkali amount in the gypsum product mixture is a concern, compounds such as sodium and potassium can be reduced in the gypsum product mixture by applying a pretreatment method to the raw CKD.

Calcium sulfate has three functional roles when blended with clinker for Portland cement production. The first function is its role as a retardant in preventing flash set. The second function is as an accelerator by increasing the rate of strength development in the cement mixture. The third function is as a modifier of the volume change characteristics of cement. Calcium sulfate can exist in any of the following four forms: gypsum, hemihydrate, water soluble anhydrite and water insoluble natural anhydrite. When gypsum is exposed to temperatures over 262° F. over short periods of time or even lower temperatures over longer periods of time, the chemical water of hydration is liberated to form a hemihydrate. If the hemihydrate form of calcium sulfate is heated to temperatures about 325° F., chemical waters of hydration will be liberated and soluble anhydrite form of calcium sulfate results. Over a prolonged period of time and at high temperatures, insoluble form of natural anhydrite can be formed. It is believed that CKD-derived gypsum product contains calcium sulfate di-hydrate, hemihydrate, and soluble forms of calcium sulfate anhydrite.

The presence of significant amounts of calcium sulfate anhydrite, as a replacement to mined gypsum, does not significantly affect setting time nor the expansion and contractions of the concrete made from these corresponding cement blends. The blends of mined gypsum and anhydrite exhibit near identical properties to that of mined gypsum under the same $SO_3$ content. Based upon the results from Table 1, the average gypsum purity of the CKD-derived gypsum product is 61.77%±10.26 while the anhydrite content is 8.15%±1.16. Furthermore, any of the forms of calcium sulfate, gypsum, hemihydrate, soluble anhydrite and natural anhydrite can be used to control the rates of setting and hardening of cement pastes. Problems associated with the rehydration of soluble anhydrite and hemihydrate in the cement paste can be overcome with continuously working the batch to prevent the possibility of false set, which can occur locally with using high levels of hemihydrate or soluble anhydrite.

Several comparisons were made of hydraulic Portland cement made from both pure gypsum and CKD-derived gypsum product. The properties that were compared included early strength, time of set, alkali content and insoluble content. The comparisons revealed that the mean purity CKD-derived gypsum product blended with clinker as Portland cement yielded successful results as per the standard set forth in ASTM C150.

Figure 3:
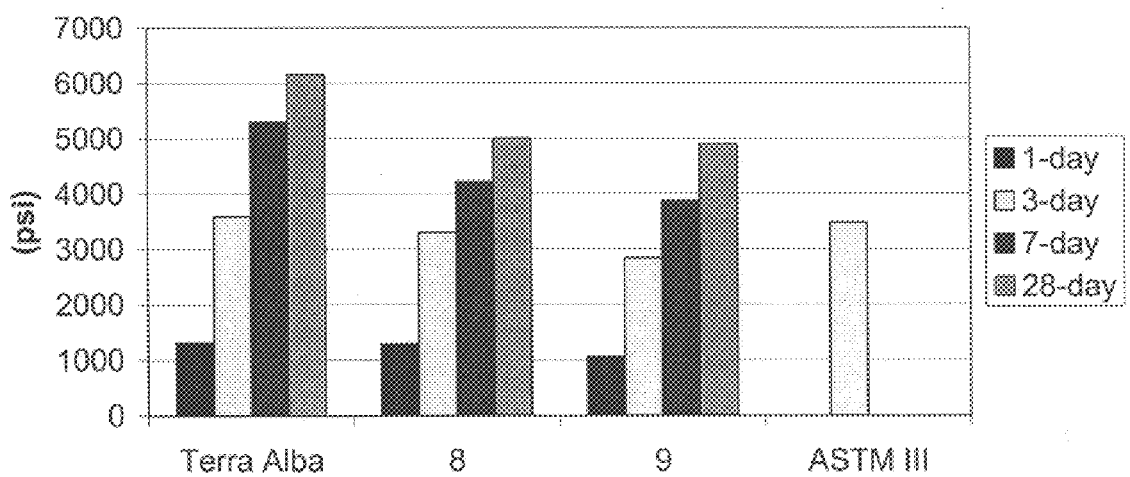
FIG. 3 is a graph of the Type III ASTM C-109 Cement Strength results for CKD derived gypsum product as Portland cement, with the gypsum product being made in accordance with one embodiment of the present invention.
Figure 4:
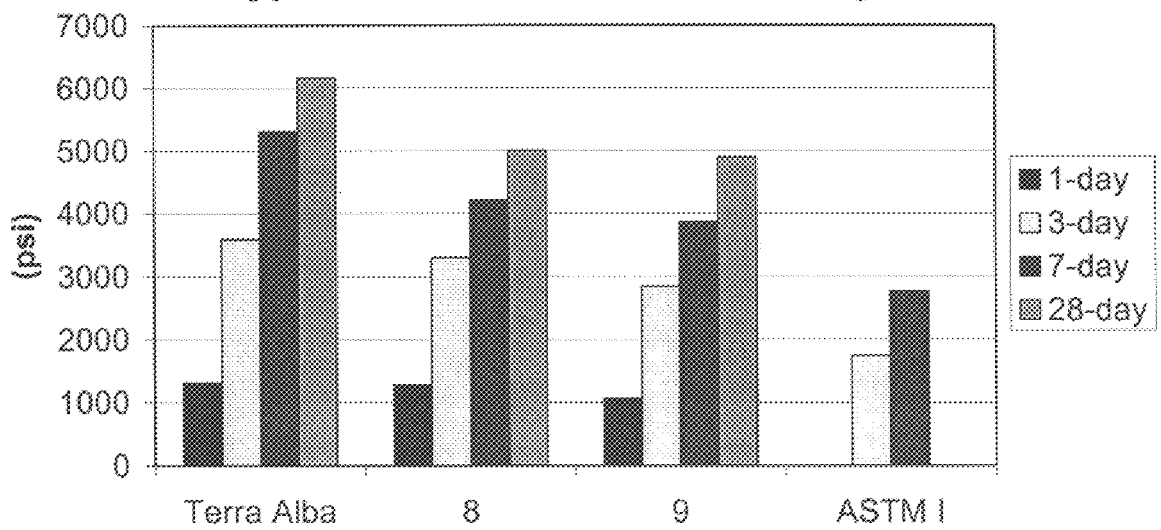
FIG. 4 is a graph of the Type I ASTM C-109 Cement Strength results for CKD derived gypsum product as Portland cement, with the gypsum product being made in accordance with one embodiment of the present invention.

FIGS. 3 and 4 illustrate the ASTM C-109 method strength test results from two CKD-Gypsum product samples with gypsum product purities of 61% and 70% respectively. The results demonstrate that samples 8 and 9, when compared with the ASTM C-150 standards, exceed the minimum value of 2000 psi for the three and seven day amounts for Type I Portland Cement. FIG. 3 illustrates similar three day strength test results for ASTM C-150 Type III hydraulic Portland cement. Both FIGS. 3 and 4 show terra alba strength values on both Type I and Type III cement. For Type III Portland cement both sample values fall short of the ASTM C-150 minimum of 3500 psi as measured according to the ASTM C-109 test. Additionally, the control terra alba sample for Type III Portland cement as illustrated in FIG. 3, falls short of the minimum strength value for three days. This anomaly can be attributed to the fineness of the grinding environment. Type III Portland cement typically is ground at 325-mesh in most North American cement plants. Unfortunately the strength tests were performed with a grinding fineness of only 250-mesh size. The increased surface area of the finer particle size is believed to allow for improved chemical interaction between the sulfate in the gypsum and the aluminates in the clinker. The improved chemical interaction results in a better performance of the gypsum in the cement as it relates to time of set and early strength.

Figure 5:
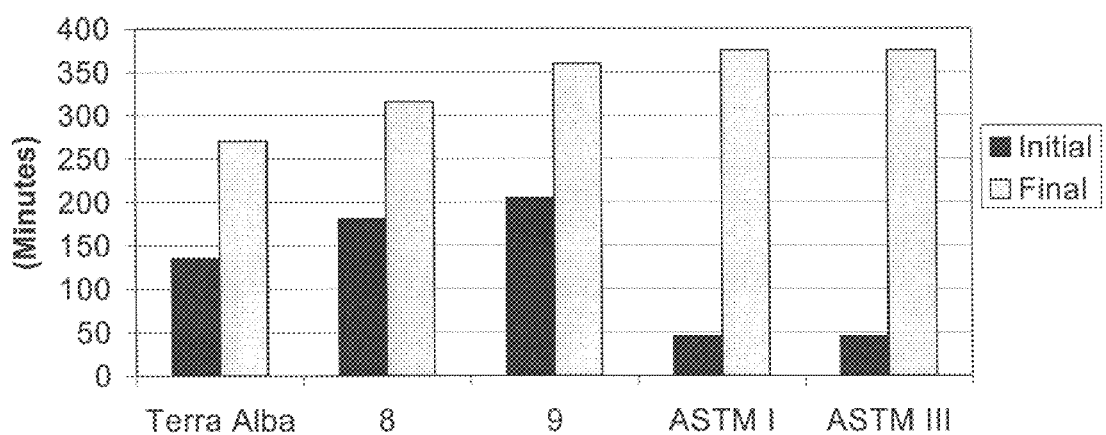
FIG. 5 is a graph of the ASTM C-191 (Vicat Method) Time of Set for CKD derived gypsum product as Portland cement, with the gypsum product being made in accordance with one embodiment of the present invention.

FIG. 5 illustrates the comparison of the same two CKD-derived gypsum product samples with terra alba as Portland cement. The three values are compared with the ASTM C-150 value for Portland cement on the chart. The Vicat Test Method measures the initial and final time of set in minutes. The maximum value of the ASTM C-150 standard is 375 minutes for final set and a minimum value of 45 minutes for initial set. Values of these samples fall within the required range for time of set.

Figure 6:
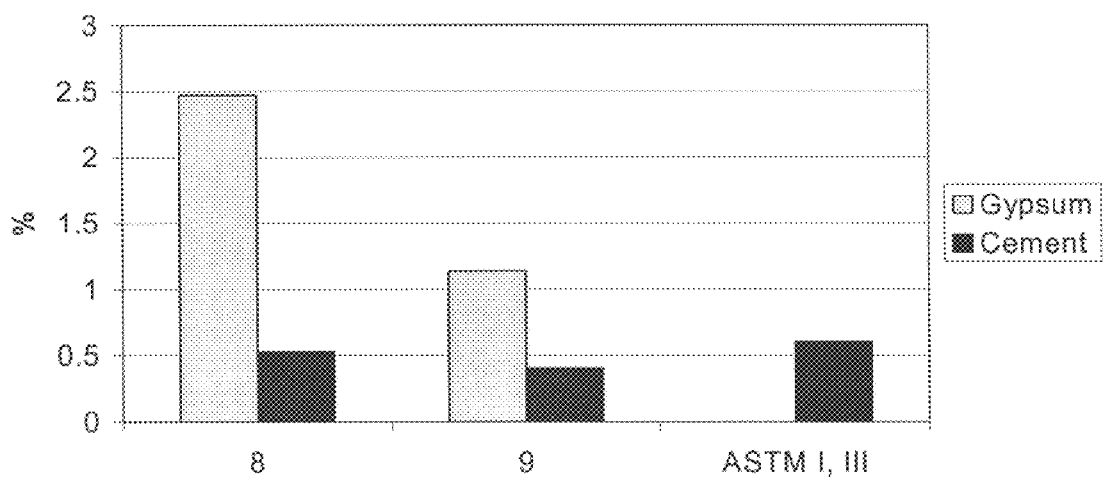
FIG. 6 is a graph of the alkali as $Na_2O$ equivalent content of CKD derived gypsum product and as Portland cement, with the gypsum product being made in accordance with one embodiment of the present invention.

FIG. 6 illustrates the comparison of the two CKD-derived gypsum product samples with terra alba as Portland cement, also. The three values are compared with the ASTM C-150 value for Portland cement on the chart. The amount of alkali content measured as $Na_2O$ equivalent for the samples were around 2.48 and 1.20 for 8 and 9 respectively. The alkali content for meeting the ASTM standard for Portland cement is around 0.6. This graph also illustrates the content of the Alkali component in the CKD-derived gypsum product, which accounts for the previously mentioned 9.25 wt % component of the Portland cement samples. Even due to the relative high alkali content of the CKD-derived gypsum product (without the removal of any preexisting sodium and potassium salts from the CKD), these alkali values still do not violate the ASTM C-150 standard of 0.75%.

FIG. 7 illustrates the values of insoluble content measured for both the gypsum product samples and the corresponding ASTM C-150 maximum. The sample gypsum product has a high insoluble content due primarily to the presence of silica and ash from the calcining process of the kiln(s). These values correspond to 5.22% and 4.76% by weight for the samples 8 and 9 respectively. The resulting cement blended from these samples corresponded to 0.48% and 0.44% respectively for samples 8 and 9. The maximum allowable insoluble content for Portland cement as per the ASTM C-150.00 standard is 0.75%. The samples illustrated in FIG. 7 using CKD derived gypsum produced cement within this maximum value acceptable by the ASTM standard.

The measured tri-calcium aluminate (C3A) content of the clinker for these tests yielded a value such that the optimization formula of gypsum addition, as per ASTM C-150, produced a required gypsum content of 7.0 wt % for the terra alba and average of 9.25 wt % for the two test samples. The optimization formula yielded an $SO_3$ content of 3.4%, which is higher than the typical 3.0%. This factor required more gypsum being added thus raising the insoluble content on the resulting cement. Also, the high final set time was affected due to the presence of excess gypsum as well as the presence of highly soluble sulfates such as potassium and sodium sulfates in the CKD-derived gypsum product samples.

CKD is regulated as a non-hazardous waste by-product from the cement industry. This invention or process allows for the transformation of CKD from a highly alkaline disposal problem, typically placed in landfills or quarries indefinitely, to a recoverable addition to the cement process primarily as gypsum ranging in purity from 30% to 90%. The result of this process to the Portland cement industry will be the near elimination of CKD disposal problems and a significant reduction in the use of commercially mined gypsum incorporated in Portland cement manufacturing.

Spent sulfuric acid is regulated as a hazardous waste by-product. This invention or process allows for the transformation of spent, or waste, sulfuric acid from a highly hazardous disposal problem to a recoverable addition to the cement process used primarily to make gypsum ranging in purity from 30% to 90%. The result of this process to the Portland cement industry will be a reduction in the amount of spent sulfuric acid discarded for disposal.

The advantages of this invention apply to both the producers of CKD and the producers of spent or by-product sulfuric acid solution. First, the cement manufacturers benefit from the reduction or elimination of a large volume waste dust that is placed in landfills or clay lined quarries, which must be monitored and maintained indefinitely. Secondly, to the cement manufacturers, the CKD derived gypsum product will offset costs associated with purchasing commercially mined or by-product gypsum as a functional retarding and strengthening agent in Portland cement manufacturing. For producers of spent sulfuric acid, an alternative outlet to incineration is created for disposing of this hazardous waste material in large volumes.

While the invention has been shown or described in only some of its forms, it should be apparent to those skilled in the art that it is not so limited, but is susceptible to various changes without departing from the scope of the invention.

For example, it is envisioned that the process can be carried out in batch operations or on a continuous operation basis. Other variations, such as different types of process equipment, can be utilized and are to be considered within the scope of the present invention.

What is claimed is:

1. A method of producing gypsum from cement kiln dust, the method comprising the step of:

reacting cement kiln dust, water, and a sulfuric acid solution to produce a gypsum product.

2. The method of claim 1, wherein the sulfuric acid solution comprises oleum.

3. The method of claim 1, wherein the sulfuric acid solution comprises waste sulfuric acid.

4. The method of claim 1, further including the step of mixing the cement kiln dust and the water prior to reacting the cement kiln dust, water, and the sulfuric acid solution to produce a gypsum product.

5. The method of claim 1, further including the step of pretreating the cement kiln dust with hot water prior to reacting the cement kiln dust, the water, and the sulfuric acid solution.

6. The method of claim 1, further including the step of adding a calcium-rich compound to the cement kiln dust.

7. The method of claim 6, wherein the calcium-rich compound is selected from the group consisting essentially of shale, marble, dolomite, limestone forms of carbonate ore, limestone forms of calcium oxide, limestone forms of calcium oxide byproducts, and combinations thereof.

8. The method of claim 1, further including the step of adding alumina prior to reacting the cement kiln dust, the water, and the sulfuric acid solution.

9. The method of claim 1, further comprising drying the gypsum product.

10. The method of claim 9, wherein the step of drying the gypsum product further comprises removing a filtrate from the gypsum product and returning at least a portion of the filtrate for use in the step of reacting the cement kiln dust, the water, and the sulfuric acid solution.

11. The method of claim 10, further comprising removing at least a portion of the filtrate and evaporating water from the filtrate to produce a sulfate based fertilizer salt.

12. The method of claim 11, further comprising returning the water from the filtrate for use in the step of reacting the cement kiln dust, the water, and the sulfuric acid solution.

13. A method of producing cement using a gypsum product derived from cement kiln dust, the method comprising the steps of:

reacting cement kiln dust, water, and a sulfuric acid solution to produce a gypsum product;

drying the gypsum product;

grinding and heating a raw material to produce a clinker wherein the raw material is selected from the group consisting of clay, shale, concrete, limestone, sand, mill scale, bauxite, fly ash, and combinations thereof; and cooling the clinker and then mixing and grinding the clinker with the gypsum product to produce the cement.

14. The method of claim 13, wherein the sulfuric acid solution comprises oleum.

15. The method of claim 13, wherein the sulfuric acid solution comprises waste sulfuric acid.

16. The method of claim 13, further including the step of mixing the cement kiln dust and the water prior to reacting the cement kiln dust, water, and the sulfuric acid solution to produce a gypsum product.

17. The method of claim 13, further including the step of pretreating cement kiln dust with hot water prior to reacting cement kiln dust, water, and a sulfuric acid solution to produce a gypsum product.

18. The method of claim 13, further including the step of adding a calcium-rich compound to the cement kiln dust.

19. The method of claim 18, wherein the calcium-rich compound is selected from the group consisting of shale, marble, dolomite, limestone forms of carbonate ore, limestone forms of calcium oxide, limestone forms of calcium oxide byproducts, and combinations thereof.

20. The method of claim 13, further including the step of adding alumina prior to reacting cement kiln dust, water, and a sulfuric acid solution to produce a gypsum product.

21. The method of claim 13, wherein the step of drying the gypsum product further comprises removing a filtrate from the gypsum product and returning at least a portion of the filtrate for use in the step of reacting cement kiln dust, water, and a sulfuric acid solution to produce a gypsum product.

22. The method of claim 21, further comprising removing at least a portion of the filtrate and evaporating water from the filtrate to produce a fertilizer salt.

23. The method of claim 22, further comprising returning the water from the filtrate for use in the step of reacting cement kiln dust, water, and a sulfuric acid solution to produce a gypsum product.

* * * * *